United States Patent
Ek

[11] Patent Number: 5,096,692
[45] Date of Patent: Mar. 17, 1992

[54] MINERALOGICAL CONVERSION OF ASBESTOS WASTE

[76] Inventor: Roger B. Ek, 2711 226th Ave., Southeast, Issaquah, Wash. 98027

[21] Appl. No.: 652,299

[22] Filed: Feb. 5, 1991

Related U.S. Application Data

[63] Continuation of Ser. No. 374,404, Jun. 29, 1989, abandoned.

[51] Int. Cl.$^5$ .................... A62D 3/00; C04B 41/46; C04B 14/40
[52] U.S. Cl. .................... 423/659; 423/331; 423/335; 423/167; 423/DIG. 20
[58] Field of Search .............. 423/331, 334, 335, 659, 423/167, DIG. 20

[56] References Cited

U.S. PATENT DOCUMENTS

| Re. 15,727 | 12/1923 | Crossley | 65/18.1 |
|---|---|---|---|
| 112,650 | 3/1871 | Stevens | 423/167 |
| 1,067,542 | 7/1912 | Pater | 423/331 |
| 1,545,132 | 7/1925 | Drambour | 423/167 |
| 2,616,801 | 11/1952 | Badollet et al. | 423/331 |
| 2,795,485 | 6/1957 | Manchot | 23/308 |
| 3,215,494 | 11/1965 | Hemstock | 423/167 |
| 3,443,891 | 5/1969 | Nichols et al. | 23/308 |
| 3,666,407 | 5/1972 | Orlemann | 162/3 |
| 3,689,430 | 9/1972 | Yates . | |
| 3,914,184 | 10/1973 | Harada et al. | 252/457 |
| 3,929,439 | 12/1975 | Pierce | 65/22 |
| 3,941,871 | 3/1976 | Dwyer et al. | 423/326 |
| 4,171,405 | 10/1979 | Pezzoli | 428/443 |
| 4,171,968 | 10/1979 | Freyhold | 106/84 |
| 4,180,433 | 12/1979 | Glass et al. | 162/3 |
| 4,180,449 | 12/1979 | Heikel | 204/296 |
| 4,192,707 | 3/1980 | Glass et al. | 162/3 |
| 4,259,146 | 3/1981 | Glass et al. | 162/3 |
| 4,328,197 | 5/1982 | Flowers | 423/327 |
| 4,380,595 | 4/1983 | Arpin | 427/221 |
| 4,430,249 | 10/1981 | Gate | 252/313 R |
| 4,478,796 | 10/1984 | Lalancette et al. | 423/155 |
| 4,495,223 | 2/1984 | Lalancette et al. | 427/215 |
| 4,495,225 | 1/1985 | Ciuba et al. | 427/236 |
| 4,678,493 | 7/1987 | Roberts et al. | 65/134 |
| 4,695,447 | 9/1987 | Shultz | 423/659 |
| 4,732,747 | 3/1988 | Garces | 423/328 |
| 4,808,198 | 2/1989 | Richter | 48/215 |
| 4,812,204 | 3/1989 | Delvaux et al. | 162/3 |
| 4,820,328 | 4/1989 | Roberts | 501/32 |

FOREIGN PATENT DOCUMENTS

| 171685 | 7/1989 | Japan . |
| 1168839A | 7/1985 | U.S.S.R. . |
| 1188145A | 10/1985 | U.S.S.R. . |

OTHER PUBLICATIONS

Marine Shale Processors, Inc. Brochure.

*Primary Examiner*—Gary P. Straub
*Attorney, Agent, or Firm*—Seed and BErry

[57] ABSTRACT

There is provided a process for the mineralogical conversion of waste asbestos to a non-asbestos product. The waste asbestos is treated with a mineralizing agent and then heated for a period of time sufficient to convert the asbestos to the non-asbestos product. The mineralizing agent is preferably a water-soluble alkali metal borate or alkali metal silicate.

13 Claims, 2 Drawing Sheets

MINERALOGICAL CONVERSION OF ASBESTOS WASTE

CROSS-REFERENCE TO RELATED APPLICATION

This application is a continuation of U.S. application Ser. No. 07/374,404 filed June 29, 1989, now abandoned.

FIELD OF THE INVENTION

The present invention relates to a process for the mineralogical conversion of waste asbestos to a non-asbestos product.

BACKGROUND OF THE INVENTION

Asbestos is an industrial mineral of fibrous nature and is a term collectively used to include such minerals as chrysotile, crocidolite, amosite, and anthophyllite. All of these minerals are hydrated silicates which generally contain substitutional iron, calcium, magnesium, and sodium in various proportions. Chrysotile represents approximately 95% of all asbestos mineral consumed for industrial and commercial purposes and may be represented by the formula: $Mg_3Si_2O_5(OH)_4$. Similarly, crocidolite, amosite and anthophyllite may be represented by the formulas $Na_6Fe_{10}Si_{16}O_{46}(OH)_2$, $(FeMg)_7Si_8O_{22}(OH)_2$ and $Mg_7Si_8O_{22}(OH)_2$, respectively. Variation in mineral chemistry and physical characteristics of asbestos has been reported and may be attributable to changes in substitutional calcium, iron, magnesium and sodium represented in the general asbestos mineral formula: $(Na, Ca, Fe, Mg)Si_xO_y(OH)_z$.

As a toxic mineral, various attempts have been made to render asbestos inert. Attempts to destroy asbestos waste using heat alone to alter asbestos fiber chemistry have been met with only limited success since asbestos fibers by their very nature are refractory. For example, chrysotile fibers have been reported to withstand temperatures up to 3000° F. for time periods of up to one-half hour. Since such a technique requires very high temperatures for fiber destruction, this approach has proved quite uneconomical.

A method utilizing reduced process temperatures is described in U.S. Pat. No. 4,678,493. In that patent, asbestos waste is converted to glass (i.e., vitrified) by mixing the asbestos waste with a melt accelerator and waste glass cullet, then melting the mixture to form a glassy substance.

Vitrification processes require that the raw material remain reasonably constant in both chemical and physical properties. For this reason, conversion of asbestos to glass requires tight control over raw material input, including control over the particle size of the raw material. This degree of control is difficult to maintain economically in asbestos waste processing. A primary reason for this difficulty is that asbestos fibers have traditionally not been used alone in the preparation of refractory insulations, electrical insulations, building materials and other products. Rather, they have been combined with materials such as fiberglass, calcium silicates, water-soluble silicates, portland cements, clays, calcium sulfate (gypsum), silica, lime, oxychloride-bonded dolomites and a variety of other components. Thus, asbestos content by weight may vary from 5% or less to almost 100% of these composite materials.

Owing to the diverse mixture possibilities encountered in actual commercial applications, it is difficult to control the vitrification process unless the amount of asbestos waste entering the process is kept low relative to the amount of glass formers required. For example, asbestos waste must be kept as a minor component to mitigate the impact of variation in raw material chemistry. Alternatively, the type of asbestos waste entering the vitrification process needs to be controlled to preclude wide variation in raw material chemistry. Thus, the vitrification of asbestos is difficult to render economically feasible.

Disposal methods for asbestos waste in the United States typically involve landfill in a monofill dump site specifically designed to contain only asbestos waste or in hazardous waste landfill sites. Owing to landfill bans, disadvantages associated with committing material to landfill dumping, and a resolve by regulatory authorities to minimize utilization of landfills of all types, there is a need in the art for a process which will convert asbestos waste into a non-asbestos product without the disadvantages associated with the prior art techniques.

SUMMARY OF THE INVENTION

Accordingly, it is an object of this invention to provide a process wherein asbestos minerals may be converted via a thermochemical, mineralogical conversion process to a non-asbestos product.

It is a further object of the present invention to provide a mineralizing process which employs only small amounts of mineralizing agents or additives.

Still a further object of this invention is to provide a method for treating asbestos waste whereby the product gives a negative test identification for asbestos fiber minerals following treatment.

Briefly stated, the present invention discloses a process for demineralizing asbestos by treating asbestos waste with a mineralizing agent and heating the treated asbestos for a period of time sufficient to demineralize the asbestos. Preferably, the mineralizing agent is selected from the group consisting of water-soluble alkali metal hydroxide, alkali metal borate or alkali metal silicate. The mineralizing agent may be applied as a wetting agent during removal of asbestos waste or may be applied after the asbestos has been removed and transported to the asbestos treatment site.

DETAILED DESCRIPTION

Figure 1:
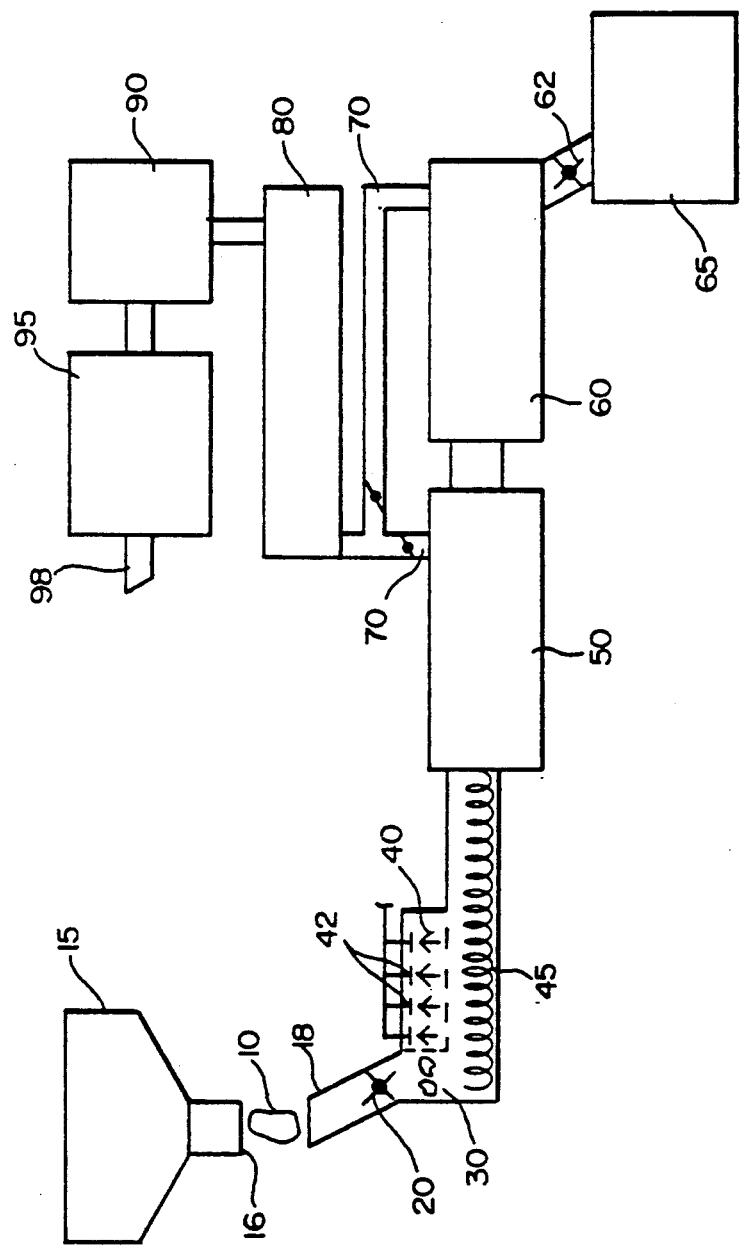
FIG. 1 is a schematic representation of a system used to practice one embodiment of the present invention.

Asbestos waste is normally broken into small pieces during removal. Water sprays are usually applied to control fugitive dusts which might be generated during the removal process. The wet asbestos material is then transported in polyethylene disposable bags specifically designed for the purpose.

Asbestos waste materials removed in such a manner are composed of asbestos fibers and usually contain other fibers of inorganic or organic origin along with other materials such a portland cement, gypsum, plaster, dolomite, and a variety of silicates. The term asbestos waste is used herein to include the asbestos mixtures mentioned above as well as any asbestos mineral fibers, including the minerals chrysoltile, amosite, anthophyllite, crocidolite and other commercial and industrial asbestos minerals collectively known as asbestos, and includes mixtures of asbestos mineral fibers with additive or matrix substances including inorganic and organic materials.

Once the asbestos waste is removed from an installation site, it is subsequently treated with a mineralizing agent. Alternatively, the mineralizing agent may be included as an additive to the water spray used to control dusts during the removal process.

The term mineralizing agent includes any chemical reagent or additive which acts to promote the mineralizing process. The mineralizing agent aids the process of converting asbestos to a non-asbestos mineral or product. Mineralizing agents include alkali metal-soluble silicates such as lithium, sodium and potassium silicates, alkali metal boron compounds, alkaline earth boron compounds, and alkali metal hydroxides. More generally, any compounds effective in sintering and mineralizing magnesium silicates would have application as a mineralizing agent. For example, fluoride salts may also be used alone or in combination with other mineralizing agents.

Preferably the mineralizing agent is a water soluble borate such as sodium borate or a water soluble silicate such as sodium silicate. Moreover, a combination of mineralizing agents may also be utilized.

While water-soluble mineralizing agents may be utilized most easily in the present invention, insoluble mineralizing agents, including calcium borate, magnesium borate, solid sodium and potassium silicates, may also be used provided they are uniformly mixed with the asbestos waste prior to heat treatment.

The concentration level of mineralizing agent in the asbestos waste required to practice the invention in a finite period of time and at a practical operating temperature, may be established depending upon the type of treatment desired. For example, if a system operating temperature and a system operating time are chosen, the required concentration of mineralizing agent may be determined as the minimum level of concentration required to permit complete mineral conversion to occur. While the mineralizing agent is preferably applied in the range of 1 to 60 pounds of agent per ton of asbestos waste, the mineralizing agent need only be present in an amount sufficient to yield mineralogical conversion under the desired temperature and time parameters chosen to run the process.

Once the asbestos waste has been treated with the mineralizing agent, the liquid content of the asbestos waste may be reduced or increased depending upon the final moisture content desired. For example, the moisture content may be reduced by passing the asbestos waste through a dryer. It is also possible to retreat the asbestos waste with additional mineralizing agent solution if desired to control agent concentrations or with dry mineralizing agent powders. In such an instance, a mixing step prior to thermal treatment is required.

Following treatment of the asbestos waste with a mineralizing agent, the asbestos waste is heated at a temperature and time sufficient for mineral conversion to occur. The temperature may range from about 1000° F. to about 3000° F. At very low temperatures, the length of time required for conversion may become too long for practical application. Similarly, at too high a temperature, the cost of operating the process may become unnecessarily expensive. Preferably, the process is carried out in a temperature range of from about 1400° F. to about 2800° F.

The term mineral conversion is used herein to mean the conversion of asbestos minerals via a solid state reaction to a product which is not identifiable as asbestos by generally accepted laboratory identification methods. In the present invention, mineral conversion of asbestos occurs due to solid state reactions driven by diffusion kinetics, sintering and crystallographic changes. Solid state reactions take place below the temperature at which the asbestos minerals melt. Thus, the formation of a glass phase, which may cause the material to adhere to and jam the processing equipment, is avoided. However, fiberglass, mineral wool and related glassy phase fibers may be present as filler materials in the asbestos waste, and devitrification of the glassy materials may nevertheless occur to a limited extent during practice of the present invention.

X-ray diffraction, transmission electron microscopy, and optical microscopy techniques used to analyze changes which occur during asbestos mineral conversion characterize the solid state reactions of the present invention as exhibiting: (1) severely disordered crystal structure as the reactions proceed and before completion; (2) presence of only crystalline phases among the asbestos mineral phases being converted to other minerals; (3) lack of presence of glassy phases in asbestos minerals which are present; and (4) newly converted minerals have crystal structures unrelated to the original asbestos minerals.

Generally, asbestos waste may be converted by this process to a different crystalline habit or crystallographic form. The converted mineral form may have a new chemical composition only slightly different from the chemical composition of the original asbestos waste. Yet the mineralogy of the converted asbestos waste does not, by mineral identification techniques specifically utilized for identification of asbestos mineral fibers, coincide with asbestos mineral fibers.

As mentioned above, heat treatment of the treated asbestos waste may be carried out over a range of temperatures and for periods of time sufficiently long to enable mineral conversion to occur. For example, at a lower temperature mineral conversion occurs after a longer period of time than at a higher temperature utilizing the same mineralizing agent.

The time-temperature relationship is important in its application to actual system design parameters based upon this invention. For example, the most suitable design for a particular asbestos conversion system will require specification of a particular operating temperature range for asbestos waste being treated for a specific time period. Importantly, mineral conversion will occur regardless of the presence of matrix materials provided that mineralizing agents are present and in contact with the asbestos fibers themselves so that the conversion may occur.

Thermal processing may take place in a batch furnace or continuous furnace which has been suitably equipped with a negative pressure air treatment system. The treatment system generally should be equipped with an exhaust gas cooling system, and gas scrubbing equipment to eliminate $SO_x$, $NO_x$ and acid gas such as HCl which may form from the combustion of organic constituents of the asbestos waste and from sources such as encapsulation packaging materials and paints. Thermal processing furnaces may be directly or indirectly fired with fossil fuels, natural gas or other combustible gas mixtures or by electric heating elements.

The thermal process equipment, including waste asbestos particle size reduction equipment, mineralizing agent additive mechanism, blenders and mixing equipment used to homogenize the agent and asbestos waste, thermal process feed mechanism including screw conveyor or pugmill, extruding equipment, dryer chambers, material feed hoppers and mineralized material hoppers may all be made mobile and portable and sent to job-site vicinity on rail car or via truck and trailer carrier.

A preferred system used in carrying out the process of the present invention is illustrated in FIG. 1. Asbestos waste 10 is fed from a portable collection hopper 15 equipped with a suitable discharge opening 16 into the inlet feed surge hopper and feed chute 18. The feed chute may be equipped with a suitable air lock such as a roto-lock valve 20. The feed material asbestos waste may be reduced in size by a shredder/grinder mechanism 30 to enable homogeneous treatment with mineralizing agent 40 fed through liquid injection nozzles or injection ports 42. A screw conveyor 45 is utilized to extrude a substantially continuous stream of asbestos waste having a controlled solution moisture content into drying chamber 50. The waste asbestos drying step may be performed in a continuous flight screw conveyor equipped with heated shell construction or optionally may be a continuous belt refractory alloy conveyor connected in common with the thermal treatment chamber 60. Mineral conversion products exiting the thermal treatment chamber 60 pass through an air lock 62 into an outlet surge hopper 65. The mineralized conversion product may subsequently be discharged into containers for other disposition.

Exhaust vapors from the drying chamber 50 and thermal treatment chamber 60 pass through dampered exhaust ducts 70 into an exhaust gas cooler 80, where the exhaust gases are cooled prior to entry into an acid gas scrubber and demister apparatus 90. Fugitive asbestos particles still possibly entrained in the exhaust gas are removed in an HEPA filter system 95. Polished exhaust gas may be then ejected into the atmosphere through stack 98.

Quality control of mineral conversion products may, for example, be accomplished by X-ray diffraction, transmission electron microscopy or optical microscopy methods.

The following specific examples are offered by way of illustration, and not by way of limitation.

EXAMPLE 1

A seven percent solution of sodium borate decahydrate (Fisher Scientific, Reagent Grade) was prepared by dissolving 7 grams of the borate salt in 100 cc of tap water at 122° F., then cooled to 85° F.

A sample of long asbestos fibers from electrical wire insulation was submitted for optical microscopy/dispersion staining and determined to contain 80% (Vol/Vol) chrysotile and approximately 20% (Vol/Vol) of fine borosilicate glass fibers. The fibers were moistened with the sodium borate decahydrate solution, with no excess liquid remaining standing on the fibers after treatment.

The moistened sample was initially heated in an electric furnace and clay crucible to a temperature of 2000° F. in a period of 2 hours. The sample was then held for 2 hours at 2000° F. and force-cooled to 300° F. over a period of 3½ hours, then removed from the furnace.

The cooled mineral conversion product was submitted for optical microscopy/dispersion staining identification. The sample analysis reported asbestos content less than the detectable level limits of 1% (Vol/Vol).

EXAMPLE 2

A solution containing 12.9 grams of commercial grade sodium silicate (P.Q. Corp., Metso Pentabead 20) was prepared by dissolving in 100 cc of tap water at 122° F., then cooled to 85° F.

A sample of electrical fibers described in Example 1 was moistened with the solution, no excess liquid was left standing on the fibers after treatment.

The moistened sample was placed in a clay crucible and heated to 2000° F. in an electric furnace within a period of 2 hours, then held for 2 hours at 2000° F., followed by force-cooling over a subsequent 3½ hours to 300° F., then removed from the furnace.

The cooled mineral conversion product was submitted for optical microscopy/dispersion staining identification. The sample analysis reported asbestos content level less than limits of 1% (Vol/Vol).

EXAMPLE 3

The solution of Example 1 was used to treat the fibers of Example 1. No excess treatment solution was left standing on the fibers after moistening.

The moistened sample was heated to 2000° F. within a period of 6 hours, then held at 2000° F. for 1½ hours, then cooled over a subsequent period of about 8 hours to 300° F., then removed from the furnace.

The cooled mineral conversion product was submitted for X-ray diffraction and X-ray fluorescence to identify minerals present in the treated sample.

Results of the examination included primarily magnesium fayalite ($MgSiO_3 \cdot FeSiO_3$), also known as iron magnesium silicate, with minor amounts of other related minerals. Trace amounts of zinc, nickel, and sulfur were measured but no asbestos, mineral wool or other fibers were detected.

Figure 2:
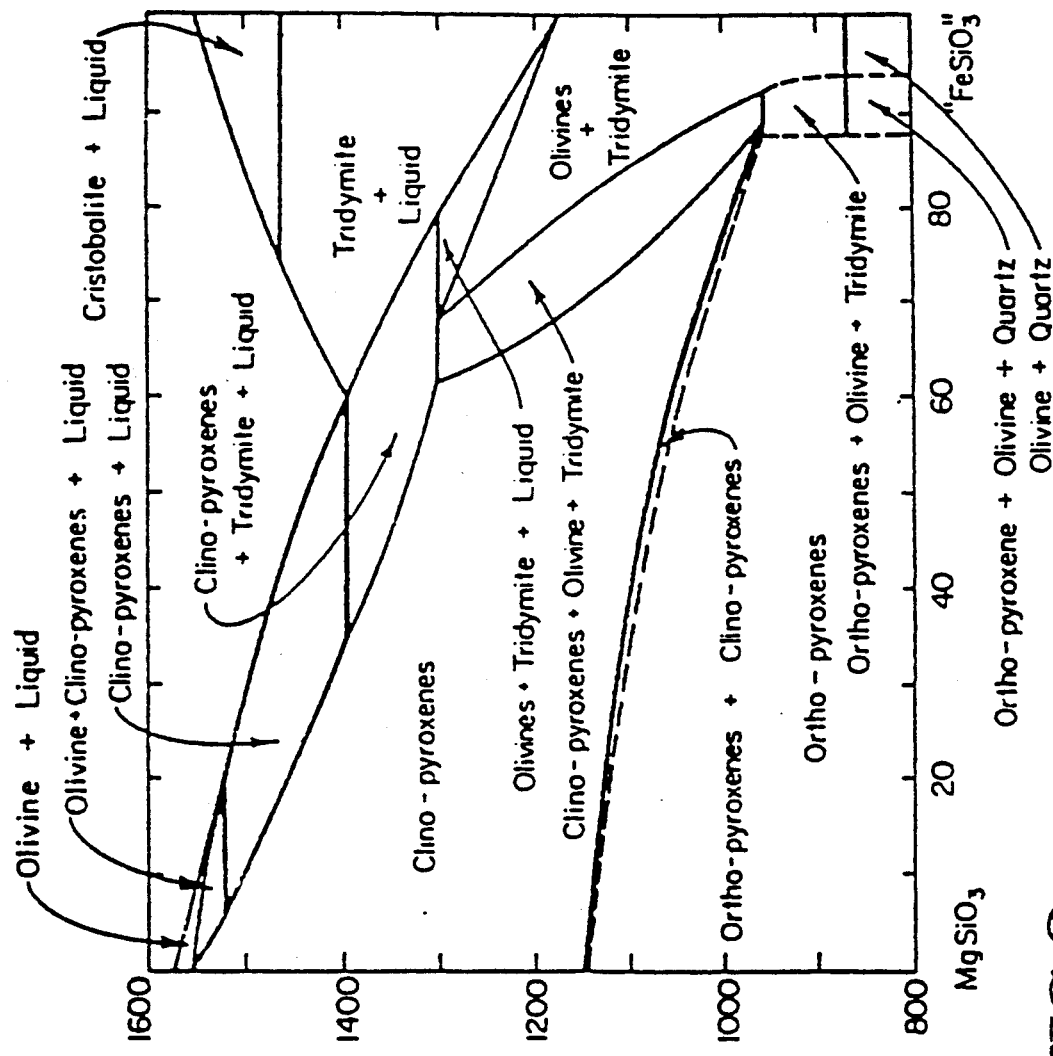
FIG. 2 is a phase diagram of magnesium fayalite.

Conversion of the asbestos to magnesium fayalite in this example takes place in the absence of liquid phase formation at 2000° F. Heating to about 2425° F. may begin to produce liquid phase as illustrated in the phase diagram of FIG. 2. (Published by Bowen et al., *Am. J. Sci.*, 5th Ser., 29:164 (1935)).

EXAMPLE 4

A sample of ¼-inch diameter and smaller asbestos-lagging material particles, which were determined to contain 70% (Vol/Vol) chrysotile and 30% (Vol/Vol) filler, was moistened with a solution containing 3.94 grams of sodium borate decahydrate per 100 grams of tap water held at 40° C. No excess solution was standing on the particles after moistening, and breaking of the largest pieces revealed that moistening was uniform throughout the sample. It was observed that the solution very readily wets the surface of the particles, including dust particles adhering to the particle surfaces, even though dust on the surface of the particles may tend to form a barrier to wetting.

The moistened samples were then heated in a clay crucible to 2000° F. within 3¾ hours, and held at 2000° F. for 1 hour, then cooled over a 3½-hour period, then removed from the furnace at 300° F.

The cooled mineral conversion product was submitted for optical microscopy/dispersion staining identification. The sample analysis reported asbestos content levels less than detectable limits of 1% (Vol/Vol). The sample was reported to contain 90% filler and 10% glass fiber (mineral wool source).

EXAMPLE 5

A portion of an asbestos woven glove was submitted for optical microscopy/dispersion staining identification. The sample was reported to contain 30% (Vol/Vol) chrysotile asbestos fiber, 40% (Vol/Vol) cotton fiber and 30% (Vol/Vol) synthetic fiber.

The remainder of the glove from which the original sample was taken was treated with the 7 wt. % solution of sodium borate described in Example 1. The solution was warmed to 104° F. prior to application on the sample. Excess solution was removed from the glove, then the glove was placed upon a 310 alloy stainless steel sheet for thermal treatment.

The glove was heated to 2000° F. within a period of 4 hours, held at 2000° F. for 1 hour and cooled within 4 hours and removed from the furnace at 300° F.

The mineral conversion product submitted for optical microscopy/dispersion staining identification was reported to contain 100% filler and less than the detectable limits of 1% (Vol/Vol) asbestos.

A microscopic examination of the conversion product fibers shows that the fibers have broken up during volume changes associated with mineral conversion processes. Only short, cylindrical fiber segments are visible. These segments show radial cracks and longitudinal splits along the axis of the fiber, suggesting that the fiber segment is in the process of breaking apart further.

EXAMPLE 6

The following example illustrates the dependence of the process upon temperature.

Identical composite samples were prepared for all test A-H. The composite samples identically contained 15 parts by dry weight of asbestos insulating board, 3 parts by weight asbestos woven cloth product, and 0.5 parts by weight of electrical insulation long fiber (loose).

All samples were heated in clay crucibles in an electric furnace; samples heated to the same temperatures were heated together at the same time. Table I lists the samples, firing temperatures, whether treated with mineralizing agent solutions (samples E-H) or whether leftuntreated (samples A-D) as control samples. Identification results from optical microscopy/dispersion staining show chrysotile asbestos content or other mineral content.

Treated samples were moistened evenly with a solution, warmed to 104° F., containing 4 grams of sodium borate decahydrate per 100 parts tap water. The samples were then dried for 1 hour at 110° F. prior to treatment.

Temperature rise schedule was performed in less than 2 hours, then held at the prescribed temperature for 2 hours, then cooled to approximately 300° F. and removed from the furnace in less than 3 ½ hours.

As shown in Table I, complete conversion of the asbestos composite waste material to the non-asbestos mineral conversion product occurred at a temperature of 1800° F. (sample H) utilizing this concentration of mineralizing agent for the time period and temperatures identified. While complete conversion did not occur in samples E (1200° F.), F (1400° F.) or G (1600° F.), a slight, moderate and advanced degree of conversion, respectively, was observed. This demonstrates that at lower temperatures, and the same amount of mineralizing agent, a longer heating time is necessary to achieve complete conversion.

TABLE I

| Sample Identification | Solution Treatment | Conversion Temperature °F. | Chrysotile Content (Remarks) |
|---|---|---|---|
| A | No | 1200 | 30% Chrysotile |
| B | No | 1400 | 30% Chrysotile |
| C | No | 1600 | 30% Chrysotile |
| D | No | 1800 | 30% Chrysotile |
| E | Yes | 1200 | 30% Chrysotile. (Slight Conversion Detected) |
| F | Yes | 1400 | 30% Chrysotile. (Moderate Conversion Detected) |
| G | Yes | 1600 | 30% Chrysotile. (Advanced Conversion Detected) |
| H | Yes | 1800 | 100% Filler. (Fibers Crumble When Disturbed) |

EXAMPLE 7

A sample of asbestos corrugated paper identified by optical microscopy/dispersion staining as containing 70% (Vol/Vol) chrysotile asbestos fiber, 20% (Vol/Vol) other fibers and 10% (Vol/Vol) filler material was moistened with a solution containing 7 grams of sodium borate decahydrate and 100 cc of tap water. The solution temperature was 104° F.

The sample was heated in a clay crucible and electric furnace to 2000° F. for 1 hour, then cooled over a subsequent 3 ½ hour period to 300° F., the withdrawn. Sample identification by optical microscopy/dispersion staining gives less than the detection limit of 1% (Vol/Vol) asbestos and 100% (Vol/Vol) filler. This filler appeared as a fibrous material but crumbles when touched. This result of crumbly texture appears typical of fiber particle disruption and destruction resulting from the mineralizing conversion process. The fractured and broken fibers will not withstand the rigors of even delicate handling.

EXAMPLE 8

The results of mineralizing conversion processes may be understood in terms of X-ray diffraction analysis technique (XRD), and transmission electron microscopy (TEM) with energy dispersion spectrometer (EDS) by examining Table II. In this case, the samples were all processed at identical temperatures (2000° F.), and time (1 hour). Only insulating board was treated with the mineralizing agent while a composite sample of glove woven fiber and insulating board was left untreated (i.e., no mineralizing agent) but exposed to the same time/temperature cycle.

The asbestos composite sample after processing still tests positive by TEM with EDS as chrysotile.

Insulating board treated with various concentrations of sodium borate decahydrate from 0.45 g/100 g tap water to 3.5 g/100 g tap water tested negative for chrysotile asbestos, as analyzed by XRD and TEM with EDS. The original 70% (Vol/Vol) asbestos content together with calcium silicate and mineral wool fiber constituents were fully converted to wollastonite, $CaSiO_3$, in a mixture with calcium magnesium iron silicates, amorphous calcium magnesium silicates, calcite, and other minor crystalline products.

The amount of mineralizing agent required for mineral conversion of asbestos waste depends upon the amount of filler in the waste, and the physical and chemical properties of the filler. For example, sodium borate decahydrate showed acceptable conversion results at a minimum concentration of about 1.00 pound of sodium borate decahydrate per ton of asbestos waste. After taking into account time-temperature relationships as they relate to the various mineral conversion mechanisms and kinetics, only marginal benefit was noticed when sodium borate decahydrate concentrations exceeded 56 pounds of sodium borate decahydrate per ton of asbestos waste. The preferred concentration of sodium borate decahydrate per ton of said asbestos waste at processing temperatures of 1600° F. to 2000° F. and for processing time periods of 1½ to 4 hours is found to be between 1.75 pounds and 56 pounds of sodium borate decahydrate per ton of asbestos waste. Once a time and temperature are selected, optimum mineralizing agent concentration may be determined by evaluating the minimum concentration of said agent which still produces 100% mineral conversion. It must be noted, however, that decrease in one variable, for example, the time variable, will require an increase in either the mineralizing agent concentration variable and/or the temperature variable. In this way, mineralizing agent concentration, time, and temperature are interrelated variables which must be considered in practicing the present invention.

cess continued, total mineral conversion of the nonfibrous altered chrysotile would be expected.

EXAMPLE 10

A sample of woven asbestos fiber cloth containing 30% (Vol/Vol) chrysotile, 40% (Vol/Vol) cotton and 30% (Vol/Vol) synthetic was treated with a solution containing 7 grams of sodium borate decahydrate per 100 cc of tap water. Thermal processing occurred by raising the temperature within 2 hours to a holding temperature of 1800° F. for 1 hour; then the sample was withdrawn from the furnace and air quenched to room temperature within 30 minutes. This time and temperature history was utilized to produce only partially processed fiber to permit process observations when the process of mineral conversion is only partially complete.

A sample of the processed material exhibited brown fibers which were determined to be chrysotile asbestos when examined by TEM with EOS. Further, at 10,000 and 25,000 magnifications, individual fibers display rough, bumpy surfaces on a scale of several micrometers. This texture is suggestive of volatile evolution. The fibers do not display split ends nor do they break into submicron fibers as is typical of unaltered chrysotile. The X-ray diffraction patterns of the fibers are poorly

TABLE II

| Number | Temp./Time | Concentrations | Material | Identification Procedure[1] and Results |
|---|---|---|---|---|
| 1 | 2000° F. 1 Hour | 0 | Glove Fabric and Insulating Board | TEM result shows woven mat of brown tinged fibers. Their chemical composition was determined by EDS, and match that of chrysotile ($Mg_3Si_2O_5(OH)_4$), calcium silicates from filler material, and amorphous fibers (from mineral wood filler sources). Unidentified phases in trace amounts are also present. |
| 2 | 2000° F. 1 Hour | 0.45 g/100 g Tap Water | Insulating Board | White friable mass. TEM/EDS results shows wollastonite, $CaSiO_3$, amorphous calcium/magnesium silicates. No fibers or phases with the composition of chrysotile were located. |
| 3 | 2000° F. 1 Hour | 0.9 g/100 g Tap Water | Insulating Board | TEM, EDS. Friable mass of white, blue green material. The dominant phase is wollastonite. An amorphous[2] calcium/magnesium/iron silicate is also found. No fibers or phases with the composition of chrysotile were located. |
| 4 | 2000° F. 1 Hour | 3.5 g/100 g Tap Water | Insulating Board | Dominant phase by XRD is wollastonite, $CaSiO_3$, with a minor iron-rich phase containing cohenite ($Fe_3C$). XRD analysis shows no evidence of chrysotile to the detection limit of approximately 5 wt. %. TEM analysis also confirms wollastonite as the dominant phase with calcium magnesium silicate, including amorphouse phases, calcite ($CaCO_3$). No fibrous material and no material with the chemical composition of chrysotile is detected in the sample. |

[1]Transmission Electron Microscopy (TEM); Energy Dispersion Spectrometer (EDS); X-ray Diffraction (XRD).
[2]Amorphous phases were identified as glassy mineral wool filler utilized in manufacture of the insulating board.

EXAMPLE 9

A sample of asbestos corrugated paper was treated to moistness with a solution containing 7 grams of sodium borate decahydrate per 100 cc of tap water. The sample was then heated within 2 hours to 2000° F. and held for 1 hour, at which time the sample was removed from the furnace and chilled quickly to room temperature to enable only a partial conversion of asbestos to other minerals.

The asbestos corrugated paper initially contained 70% (Vol/Vol) chrysotile fiber, 20% (Vol/Vol) other fibers identified as paper and 10% (Vol/Vol) filler.

After examination of the process sample by TEM, the sample resembled altered chrysotile. The sample was nonfiberous and altered by a combination of chemical reaction and high temperature. Had the alteration prodeveloped and asymmetric, indicating an extremely disordered crystal structure. This example is typical of asbestos fibers undergoing mineral conversion, especially as it relates to the observation of an extremely disordered crystal structure. This result may be expected when the mineral conversion process is only partially complete.

From the foregoing, it will be appreciated that, although specific embodiments of the invention have been described herein for purposes of illustration, various modifications may be made without deviating from the spirit and scope of the invention. Accordingly, the invention is not to be limited except as by the appended claims.

I claim:

1. A process for the mineralogical conversion of an asbestos waste containing asbestos fibers to a non-asbestos product, comprising:

heating the asbestos waste in the presence of a mineralizing agent for a period of time sufficient to convert the asbestos fibers to a non-asbestos mineral, wherein said heating occurs at a temperature of 1000° to 3000° F. but below the melting point of the asbestos fibers, and wherein said mineralizing agent is selected from an alkali metal hydroxide, an alkali metal silicate, an alkali metal borate, an alkaline earth borate, or mixtures thereof, and is present in an amount sufficient to convert the asbestos fibers to the non-asbestos mineral, said amount ranging from 1 to 60 pounds of mineralizing agent per ton of asbestos waste, and further wherein said mineralizing agent acts to promote the conversion of the asbestos fibers via a solid state reaction to the non-asbestos minerals without the formation of a glass phase.

2. The process of claim 1 wherein the mineralizing agent is water-soluble.

3. The process of claim 2 wherein the water-soluble mineralizing agent is an alkali metal hydroxide.

4. The process of claim 3 wherein the alkali metal hydroxide is sodium hydroxide.

5. The process of claim 2 wherein the water-soluble mineralizing agent is an alkali metal borate.

6. The process of claim 5 wherein the alkali metal boron compound is sodium borate.

7. The process of claim 2 wherein the water-soluble mineralizing agent is an alkali metal silicate.

8. The process of claim 7 wherein the alkali metal silicate is sodium silicate.

9. The process of claim 1 wherein the mineralizing agent is insoluble in water.

10. The process of claim 1 wherein the asbestos fibers are heated at a temperature ranging from 1400° F. to 2800° F.

11. The process of claim 1 wherein the asbestos fibers are heated at a temperature ranging from 1600° F. to 2000° F.

12. The process of claim 1 wherein the asbestos fibers are heated at a temperature of about 2000° F.

13. The process of claim 1 further including, prior to the heating step, drying the asbestos waste to remove excess water.

* * * * *

UNITED STATES PATENT AND TRADEMARK OFFICE
CERTIFICATE OF CORRECTION

PATENT NO. : 5,096,692
DATED : March 17, 1992
INVENTOR(S) : Roger B. Ek

It is certified that error appears in the above-identified patent and that said Letters Patent is hereby corrected as shown below:

In column 12, claim 6, line 6, please delete "boron compound" and substitute therefor -- borate --.

Signed and Sealed this

First Day of June, 1993

Attest:

MICHAEL K. KIRK

Attesting Officer    Acting Commissioner of Patents and Trademarks